May 24, 1955

F. W. BUBB ET AL 2,709,079

OSCILLATORY APPARATUS

Filed Aug. 17, 1953

Frank W. Bubb,
Robert L. Morton Jr,
Inventors.
Koenig and Pope
Attorneys.

May 24, 1955

F. W. BUBB ET AL 2,709,079

OSCILLATORY APPARATUS

Filed Aug. 17, 1953

Frank W. Bubb,
Robert L. Morton Jr.,
Inventors.
Koenig and Pope
Attorneys.

United States Patent Office 2,709,079
Patented May 24, 1955

2,709,079

OSCILLATORY APPARATUS

Frank W. Bubb, Webster Groves, and
Robert L. Morton, Jr., Ladue, Mo.

Application August 17, 1953, Serial No. 374,804

18 Claims. (Cl. 267—1)

This invention relates to oscillatory apparatus, and more particularly to apparatus of this class useful in such devices as animated toys, advertising displays, amusement devices for playgrounds, and the like.

Among the several objects of the invention may be noted the provision of an oscillatory appartus comprising a body carried by a spring suspension in which energy may be initially stored and which upon release of the stored energy acts to produce a unique compound oscillation of the body, the motion being such that the apparatus is particularly useful as the basis of animated toys, advertising display devices, or amusement devices for use in playgrounds and the like; the provision of apparatus of the class described wherein, upon storage of energy in the spring suspension and subsequent release of the stored energy, the body is set into motion including alternative phases of linear oscillation and angular oscillation, which, in the case of the use of the apparatus in an animated toy or advertising display device, is mystifying and highly interesting to the observer, and which, in the case of the use of the apparatus in an amusement device, offers interesting physical sensations due to the variety of the motion; and the provision of apparatus of the class described which is relatively economical to construct and which when manually set in motion will inherently continue in motion for a substantial period of time. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is an elevation of an embodiment of the oscillatory apparatus of this invention which is particularly suitable for use in a device such as an animated toy or advertising display, and illustrating an oscillatory body of the apparatus in an equilibrium position;

Corresponding reference characters indicate corresponding parts throughout the several views of the drawings.

Figure 1:
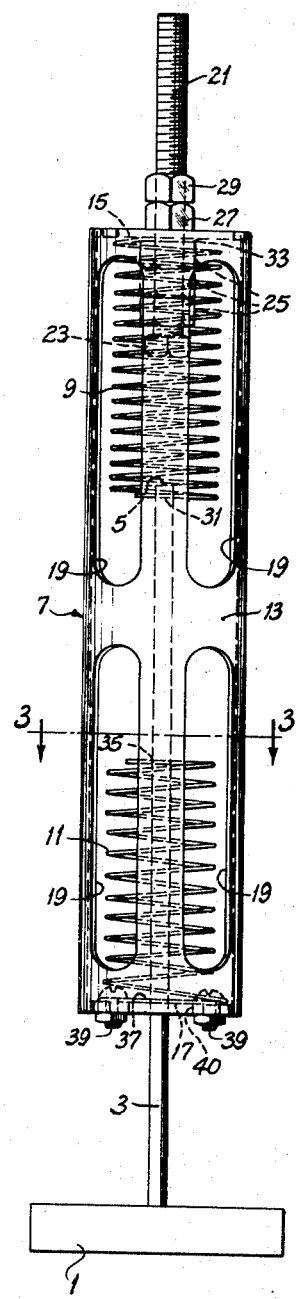
Figure 2:
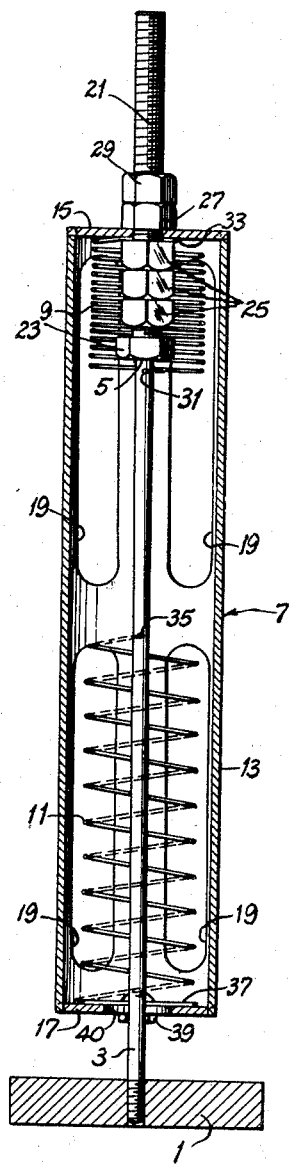
Fig. 2 is a vertical section of Fig. 1, taken on line 2—2 of Fig. 3, and illustrating the oscillatory body in a position displaced from its equilibrium position.
Figure 3:
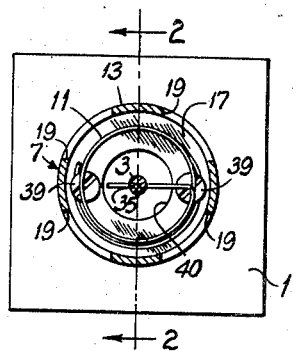
Fig. 3 is a horizontal cross section taken on line 3—3 of Fig. 1.
Figure 5:
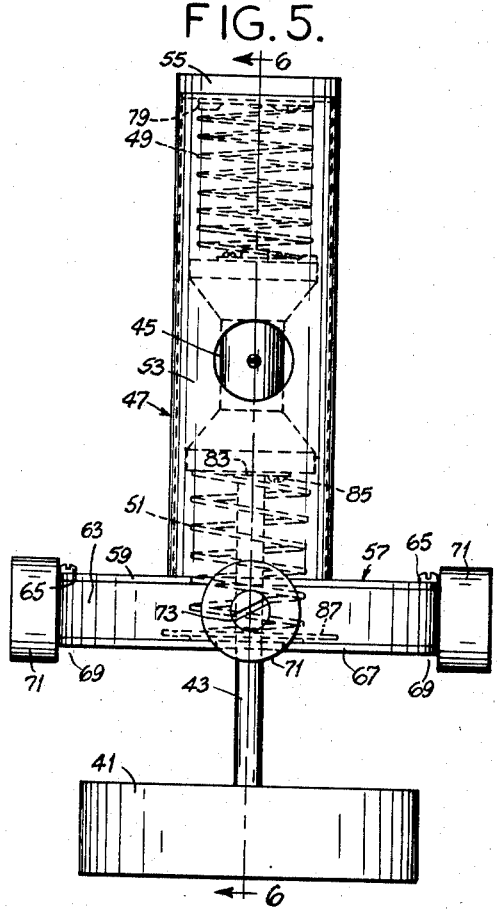
Fig. 5 is an elevation of another embodiment of the invention which is particularly suitable for use in a relatively large advertising display device or as an amusement device of the nature described, illustrating an oscillatory body in an equilibrum position.
Figure 6:
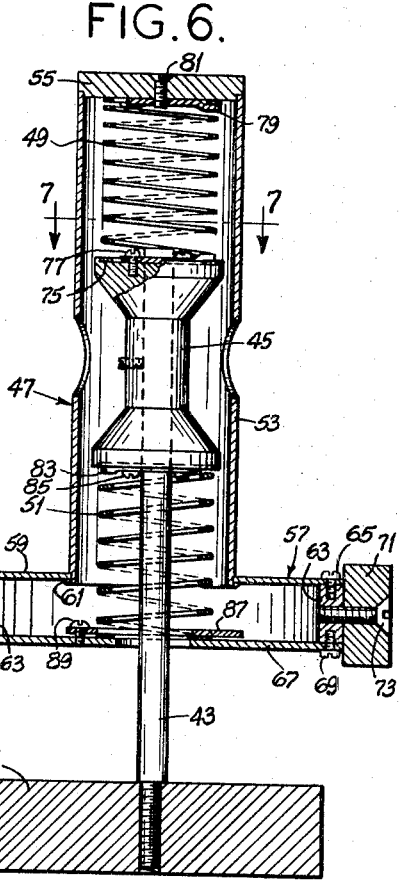
Fig. 6 is a vertical section taken substantially on line 6—6 of Fig. 5, illustrating the oscillatory body in equilibrium position.
Figure 7:
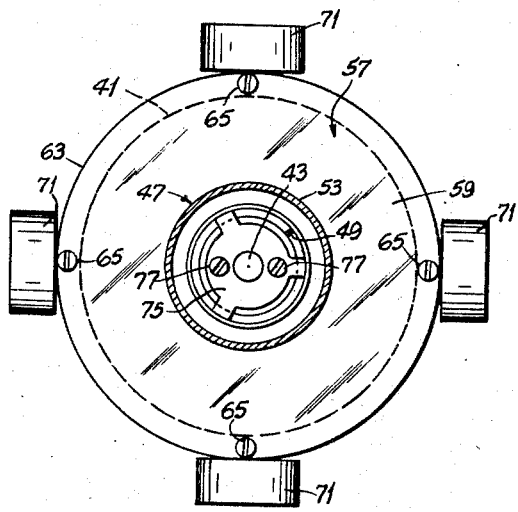
Fig. 7 is a horizontal section taken on line 7—7 of Fig. 6.
Figure 8:
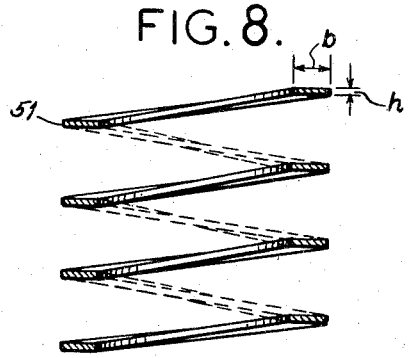
Fig. 8 is an enlarged vertical section of a portion of the length of a spring shown in Figs. 5 and 6.

Referring to the drawings, Figs. 1–3 illustrate a first embodiment of the invention which is shown to comprise a base 1 and a vertical support in the form of a post 3 extending upward from the base. The upper end of the post is indicated at 5. An oscillatory body 7 in the form of a cage is carried by the post 3 by means of a spring suspension including a pair of coil springs 9 and 11, each attached at one end to the support and at its other end to the body 7. The springs extend vertically, being axially aligned, and are shown as being tension springs, both under tension in the equilibrium position of the body illustrated in Fig. 1. The body 7 is afforded linear oscillation on the vertical spring axis and angular oscillation about the spring axis. The period of linear oscillation of the body is made approximately equal to its period of angular oscillation. How this is accomplished will be subsequently explained. The body 7 is displaceable from its Fig. 1 equilibrium position either linearly (up or down), or angularly (by twisting it in one direction or the other). Either such mode of displacement stores energy in the spring suspension and, upon release, this energy sets the body 7 into motion including alternating phases of linear, angular, and compound intermediate oscillations. That is, assuming for example that the body 7 has been initially displaced vertically downward, it will upon release initially oscillate substantially linearly up and down without any substantial angular oscillation; then the motion will progress to an angular oscillation continuing for a time without any substantial linear oscillation; then the motion will progress back to a linear oscillation, and so on. The reasons for this motion will be subsequently developed.

More particularly, the oscillatory body or cage 7 comprises a hollow cylinder 13 having upper and lower end heads 15 and 17, respectively. The wall of the cylinder has slots indicated at 19. A screw 21 is threaded in the upper end head 15 extending axially of the cylinder (and aligned with the post 3), with the head 23 of the screw inside the cylinder. Threaded on the screw between the screw head 23 and the cylinder head 15 are a number of nuts 25. A nut 27 is threaded on the portion of the screw projecting upward from cylinder head 15 to bear against head 15, and a lock nut 29 is threaded on the screw backing the nut 27. The upper spring 9 is located inside the body 7 and has its lower end attached to the upper end of the post 3 as indicated at 31. This attachment may be simply made by inserting the end of the spring in a hole in the post. Spring 9 extends upward above the upper end of the post, having its upper end 33 attached to the body 7 by being clamped between the uppermost of the nuts 25 and the bottom or inside face of the upper cylinder head 15. The lower spring 11 is also located inside the body 7 and has its upper end attached to the post 3 as indicated at 35. It extends downward, surrounding the post, having its lower end 37 attached to the lower head 17 of the body 7 as by means of bolt and nut fasteners 39. The cylinder 13 surrounds the post 3 in coaxial relation to the post and the springs 9 and 11, the lower cylinder head 17 having a central opening 40 freely receiving the post.

The springs 9 and 11 are helical coil springs. As shown, the springs are identical except that spring 9 may have more turns or coils than spring 11. The attachments 31 and 35 of the lower end of spring 9 and the upper end of the spring 11 to the post 3 are vertically spaced from one another, and attachment 35 is spaced above the base 1 a sufficient distance to allow an ample downward displacement of the body 7 from its Fig. 1 equilibrium position. It will be observed by comparing Figs. 1 and 2 that when the body 7 is displaced downward from its equilibrium position (wherein the lower spring 11 pulls up on the body 7 with a force equal to the downward pull exerted on the body by spring 9 and by gravity), the lower spring 11 is lengthened and the upper spring 9 is shortened. As shown in Fig. 2, downward displacement of the body 7 is limited by engagement of the screw head 23 with the upper end 5 of the post 3. Upon release of the body 7, it is set into motion, the first phase of which involves vertical linear oscillation without substantial angular oscillation on the vertical axis of the springs, this being coincident with the axis of the cylinder 13 and the post. The amplitude of this initial linear oscillation phase is, of course, dependent upon the extent of the initial displacement, the amplitude of the first oscillation upon release being only slightly less than twice the aforementioned displacement.

In the course of the vertical linear oscillation of the body 7, upon each upstroke of the body the upper spring 9 is lengthened and the lower spring 11 is shortened, and upon each downstroke of the body, the upper spring is shortened and the lower spring is lengthened. As to either spring, shortening increases its diameter and lengthening decreases its diameter. Thus, upon each upstroke of the body 7, the diameter of the upper spring 9 is decreased and the diameter of the lower spring 11 is increased, and upon each downstroke of the body 7, the diameter of the upper spring is increased and the diameter of the lower spring is decreased. This increase and decrease of spring diameter is reflected in torsional oscillation (twist) of the springs and hence in angular oscillation of the body 7. Since, as illustrated, the body has been set into motion with linear oscillation, the effect of the torsional oscillation of the springs is at first undiscernible, but soon the amplitude of the vertical oscillations of the body 7 begins progressively to decrease and the amplitude of the angular oscillations of the body 7 concomitantly progressively increases until there is a substantially complete interchange of energy, i. e., from energy of vertical oscillation to energy of angular oscillation about the vertical axis of the apparatus. Then follows a phase of motion wherein the body oscillates angularly without discernible vertical linear oscillation. This continues for a time, and soon the amplitude of the angular oscillations begins progressively to decrease and the amplitude of the vertical oscillations to increase until again the motion of the body returns to a phase of vertical linear oscillation without discernible angular oscillation. The cycle of linear to angular oscillation and back to linear oscillation is repeated until the energy stored in the spring system by the initial displacement is gradually dissipated.

Figure 4:
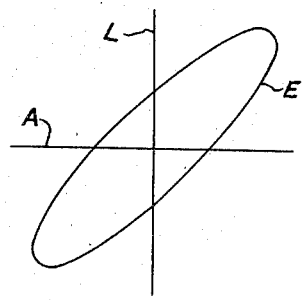
Fig. 4 is a diagram ideally illustrating the path of movement of a point on the oscillatory body as developed on the plane of the drawing.

Fig. 4 illustrates successive paths of movement of a point on the body 7. The line L in Fig. 4 is the path of a point on the body during a phase of vertical linear oscillation without discernible angular oscillation. The line A illustrates the apparent path of a point on the body during a phase of angular oscillation without discernible vertical linear oscillation. Actually, the path of a point on the body during the angular oscillation phase is on the surface of a cylinder, and Fig. 4 is idealized to show the path developed on the plane of the drawing. The oval E in Fig. 4 represents one of the apparent paths of a point on the body during a progression from linear to angular oscillation (or vice versa), wherein the motion of the point on the body is the resultant of both linear and angular oscillations.

It will be understood that alternatively the body 7 may be set in motion by twisting it on the vertical axis of the apparatus instead of linearly displacing the body. In such case, the first phase of motion is angular oscillation without discernible linear oscillation; otherwise the action is the same as that above described.

During the motion of the body 7 as above described, its axis is effectively maintained substantially vertical and coincident with the axis of the springs 9 and 11 by the tension in the springs and the fact that the points of attachment 31 and 35 are spaced. In the event that the body 7 should tilt, the result is that the spring is angled with respect to the post 3, and is thrown axially out of coincidence with the post but since the fixed ends of the springs are spaced apart on post 3, the tension in the springs thereupon imposes a restorative couple on the body 7 which restores it to vertical position. In this respect, it will be observed that either one of the springs may be regarded as means for effecting the linear and angular oscillation of the body 7 and the other as means acting on the body establishing a force tending to hold the body in line while allowing the linear and angular oscillation of the body. Thus, wobbling of the body such as would destroy the intended motion is effectively prevented.

As previously stated, the period of linear oscillation and the period of angular oscillation of the body 7 are made at least approximately equal to obtain the best action of the body. The period of linear oscillation of the body is dependent upon its weight and the lineal rigidity of the spring system. Mathematically, the period of linear oscillation is denoted by the formula $$P_L = 2\pi\sqrt{\frac{W}{gK_L}}$$

wherein $P_L$ is the period of linear oscillation, W is the weight of the body, g is the acceleration due to gravity, and $K_L$ is a constant expressing the load necessary to produce a unit lineal displacement of the spring system. The period of angular oscillation of the body 7 is denoted by the formula $$P_A = 2\pi\sqrt{\frac{I}{K_A}}$$

wherein $P_A$ is the period of angular oscillation, I is the moment of inertia of the body about its vertical axis, and $K_A$ is a constant expressing the torsional moment necessary to produce a unit twist or angular displacement of the spring. Given a particular spring suspension, $P_L$ and $P_A$ may be equated, for example, by adjustment of the weight W of the body, without substantially varying its moment of inertia I. In the case of the apparatus illustrated in Figs. 1 and 2, the weight of of the body 7 is readily adjusted for equating $P_L$ and $P_A$ by adding or subtracting nuts 25, which serve as replaceable weights. This has little effect on the moment of inertia, since the nuts or weights 25 are carried substantially on the vertical axis of the body 7 and have negligible radial dimensions.

The two springs 9 and 11 act in opposition to one another linearly, and may act either together or in opposition to one another angularly. For the springs to act together angularly, they must both be coiled in the same direction. That is, both springs must be right hand coil springs, or both left hand coil springs. If one spring is a right hand coil spring and the other a left hand coil spring, the torques of the springs will oppose one another, and in this case one spring must be torsionally stronger than the other. In the case wherein the springs are both coiled in the same direction, they may either be of equal strength in torsion or of different strengths, as desired. The springs need not necessarily be of helical form; they may be of conical, spiral, or other suitable form, provided they are capable of both longitudinal displacement and twist.

The apparatus illustrated in Figs. 1–3 is particularly suitable for use in devices of relatively small size, such as toys and small advertising displays to be attached to the cage 7, the torque required to produce angular oscillation of the body 7 in such small devices being relatively low. A typical use for the apparatus shown in Figs.

1-3 is in a dancing doll, in which case the body 7 may be enclosed and concealed within any desired figure, or itself made a desired figure. It will be observed that simply by pushing down on it, it may be set in motion as above described, and thus made to "dance" with a variety of movements including the stated alternating phases of vertical linear oscillation and angular oscillation.

Figs. 5–8 illustrate another embodiment of the invention which is particularly suitable for use in larger devices such as larger advertising display devices and amusement devices of the class previously mentioned. This heavier-duty embodiment comprises a base 41 and a vertical support in the form of a post 43 extending upward from the base. Fixed on the post at its upper end is a spool-shaped member 45. An oscillatory body 47 is carried by the post 3 by means of a spring suspension including an upper spring 49 and a lower spring 51. The body 47 comprises an elongate hollow cylinder 53 closed at its upper end by a head 55. At the lower end of the cylinder is a disk, generally designated 57, of considerably greater diameter than the cylinder. This disk, as illustrated, comprises an upper plate 59 riveted as indicated at 61 to the lower end of the cylinder, an outer ring 63 secured to the upper plate 59 as by screws 65, and a lower plate 67 secured to the ring as by screws 69. Plate 67 constitutes a lower head for the cylinder. Replaceable weights 71 are held to the ring 63 as by screws 73, thus being located radially outward of the vertical axis of the body 47. In the case of the use of the apparatus as an advertising display device, the disk 57 may serve as a platform table for articles to be displayed in oscillation. In the case of the use of the apparatus as a playground amusement device, the disk may serve as a platform on which children may stand while operating the apparatus. Handles may be provided for children to hold on to while standing on the platform. A child may obtain vertical motion of the device by jumping or bouncing up and down. A child may compensate for excess weight or lack of weight by pushing or pulling his body in or out, while holding on to the handles, to adjust the moment of inertia of the device to a value such as to obtain substantial coincidence of the periods of vertical linear oscillation and angular oscillation. The upper spring 49 has its lower end attached to the top of the spool 45 as by a clamp member 75 fastened to the top of the spool by screws 77. It extends upward from the spool and has its upper end attached to the bottom of the upper head 55 as by a clamp member 79 fastened to the head 55 by a screw 81. The lower spring 47 has its upper end attached to the bottom of the spool as by a clamp member 83 fastened by screws 85. It extends downward, surrounding the post 43, and has its lower end attached to the lower plate 67 as by a clamp member 87 fastened to 67 by screws 89.

Noting that the body 47 has a relatively high moment of inertia because of the disk 57 (including ring 63 and weights 71), the springs 47 and 49 are made of flat spring wire, instead of round wire as in the embodiment of Figs. 1–3, with the long dimension of the wire section radial. Thus, the spring suspension has sufficient torsional strength to effect angular oscillation of the body 47, without being so stiff in tension as to prevent vertical oscillation of the body of the desired amplitude and duration. Taking the width of the flat wire of spring 51, for example, as $b$ and its thickness as $h$ (see Fig. 8), the stiffness of the spring in torsion is proportional to the moment of inertia of the rectangular cross section of the wire about a vertical axis through the center of gravity of the rectangular section, and this moment of inertia equals $$\frac{b^3 h}{12}$$

The stiffness of the spring in tension is proportional to the moment of inertia of the rectangular cross section of the wire about a horizontal axis through the center of gravity of the rectangular section, and this moment of inertia equals $$\frac{bh^3}{12}$$

The ratio of stiffness in torsion to stiffness in tension thus is $$\frac{b^2}{h^2}$$

and since $b$ is greater than $h$, the stiffness in torsion is greater than the stiffness in tension.

In the case of the embodiment shown in Figs. 5–8, as in the embodiment shown in Figs. 1–3, the periods of linear and angular oscillation $P_L$ and $P_A$ of the body 47 are made approximately equal. This may be effected, for example, by properly selecting the proper positions and weights of elements 71. In this case, changing the weights substantially changes both the mass and the moment of inertia of the assembly including body 47. Referring again to the formula for determining $P_A$ (the period of angular oscillation), it will be observed that since the constant $K_A$ expressing the stiffness in torsion of the spring is relatively high, in equating $P_A$ to $P_L$, the moment of inertia of the assembly attached to body 47 may also be made high. Thus this form of the invention lends itself to the provision of a substantial radial platform for carrying articles to be displayed (as in the case of a window display) or to support occupants (as in the case of a playground amusement device). If desired, masses such as 71 may be appropriately removed as display articles are placed on the platform 59.

It will be understood that if the apparatus embodying the invention is made sufficiently large, the effects of added weights of, for example, articles to be displayed, or children in the case of playground apparatus, may be made to be relatively small upon the desired operations of the apparatus.

In some cases, and particularly in the case of the use of the apparatus as an advertising display device, it may be desirable to provide means for automatically imparting impulses to the oscillatory body at appropriate intervals to maintain it in motion. Such means, for example, may comprise a magnetic device operable periodically to impart a vertical impulse to the oscillatory body during its vertical motion to maintain energy in the system.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Oscillatory apparatus comprising a support, a body, means carrying the body on the support comprising a spring suspension including at least one coil spring attached at one end to the support and at its other end to the body, the body being afforded linear oscillation on the spring axis and angular oscillation about the spring axis with the period of linear oscillation approximately equal to the period of angular oscillation, said body being displaceable from an equilibrium position either linearly or angularly and, upon release, being set into motion including alternating phases of linear and angular oscillation, and means including said spring acting on the body tending to hold the body on a line of motion substantially fixed relative to said support while allowing said linear and angular oscillation of the body.

2. Oscillatory apparatus comprising a support, a body, means carrying the body on the support comprising a spring suspension including at least one coil tension spring attached at one end to the support and at its other end to the body, the body being afforded linear oscillation on the spring axis and angular oscillation about the spring axis with the period of linear oscillation at least approximately equal to the period of angular oscillation, said body being displaceable from an equilibrium position wherein said spring is under tension either linearly or angularly and, upon release, being set into motion including alternating phases of linear and angular oscillation, and means including said spring acting on the body establishing a force tending to hold the body on a line of motion substantially fixed relative to the support while allowing said linear and angular oscillation of the body.

3. Oscillatory apparatus comprising a support, a body carried by the support by means of a spring suspension comprising a pair of coil springs each attached at one end to the support and at its other end to the body, said springs being axially aligned and under stress in an equilibrium position of the body, the body being afforded linear oscillation on the spring axis and angular oscillation about the spring axis with the period of linear oscillation at least approximately equal to the period of angular oscillation, said body being displaceable from its equilibrium position either linearly or angularly and, upon release, being set into motion including alternating phases of linear oscillation and angular oscillation, the tension in the springs maintaining axial alignment of the springs and the body.

4. Oscillatory apparatus comprising a support, a body carried by the support by means of a spring suspension comprising a pair of coil tension springs each attached at one end to the support and at its other end to the body, said springs being axially aligned and both under tension in an equilibrium position of the body, the body being afforded linear oscillation on the spring axis and angular oscillation about the spring axis with the period of linear oscillation at least approximately equal to the period of angular oscillation, said body being displaceable from its equilibrium position either linearly or angularly and, upon release, being set into motion including alternating phases of linear oscillation and angular oscillation, the tension in the springs maintaining axial alignment of the springs and the body.

5. Oscillatory apparatus comprising a vertical support, a body carried by the support by means of a spring suspension comprising an upper coil spring and a lower coil spring, the upper spring being attached at one end to the support and at its other end to the body, the lower spring being attached at one end to the support and at its other end to the body, the springs being vertically aligned and under stress in an equilibrium position of the body, the body being afforded linear oscillation on the spring axis and angular oscillation about the spring axis with the period of linear oscillation at least approximately equal to the period of angular oscillation, said body being displaceable from its equilibrium position either linearly or angularly and, upon release, being set into motion including alternating phases of linear oscillation and angular oscillation, the stress in the springs maintaining axial alignment of the springs and the body.

6. Oscillatory apparatus comprising a vertical support, a body carried by the support by means of a spring suspension comprising an upper coil tension spring and a lower coil tension spring, the upper spring being attached at one end to the support and at its other end to the body, the lower spring being attached at one end to the support and at its other end to the body, the springs being vertically aligned and both under tension in an equilibrium position of the body, the body being afforded linear oscillation on the spring axis and angular oscillation about the spring axis with the period of linear oscillation at least approximately equal to the period of angular oscillation, said body being displaceable from its equilibrium position either linearly or angularly and, upon release, being set into motion including alternating phases of linear oscillation and angular oscillation, the tension in the springs maintaining axial alignment of the springs and the body.

7. Oscillatory apparatus comprising a base, a post extending vertically upward from the base, an upper helically coiled tension spring having its lower end attached to the post and extending upward above the upper end of the post substantially concentric with the post, a lower helically coiled tension spring having its upper end attached to the post and extending downward surrounding the post and substantially concentric with the post, a hollow body surrounding the springs, the upper spring being attached at its upper end to the body and the lower spring being attached at its lower end to the body, the springs being under tension in an equilibrium position of the body, the body being afforded linear oscillation on the vertical axis of the post and the springs and also angular oscillation about said axis with the period of linear oscillation at least approximately equal to the period of angular oscillation, said body being displaceable from its equilibrium position vertically upward or downward or angularly, and, upon release, being set into motion including alternating phases of vertical linear oscillation and angular oscillation about the vertical axis of the post, and the tension in the springs maintaining the body on said vertical axis.

8. Oscillatory apparatus as set forth in claim 7 wherein the body comprises a hollow cylinder having upper and lower end heads, the upper end of the upper spring being attached to the upper head and the lower end of the lower spring being attached to the lower head.

9. Oscillatory apparatus as set forth in claim 7 wherein the body carries replaceable weights for varying its mass.

10. Oscillatory apparatus as set forth in claim 9 wherein the weights are carried substantially on the vertical axis for varying the mass of the body without substantially varying its moment of inertia about said vertical axis.

11. Oscillatory apparatus as set forth in claim 9 wherein the weights are carried at locations radially outward of the vertical axis for varying both the mass of the body and its moment of inertia about the vertical axis.

12. Oscillatory apparatus as set forth in claim 7 wherein the body comprises a hollow cylinder having upper and lower end heads, the upper end of the upper spring being attached to the upper head and the lower end of the lower spring being attached to the lower head, and wherein a screw is threaded in the upper end head extending on the vertical axis of the post, said screw having nuts threaded thereon for weighting the body, and the lower end of the screw being engageable with the upper end of the post to limit downward displacement of the body.

13. Oscillatory apparatus as set forth in claim 7 wherein the body comprises a hollow cylinder carrying a concentric disk of greater diameter than the cylinder.

14. Oscillatory apparatus as set forth in claim 13 wherein the disk is at the lower end of the cylinder.

15. Oscillatory apparatus as set forth in claim 13 wherein the disk carries replaceable weights on its periphery.

16. Oscillatory apparatus as set forth in claim 7 wherein at least one spring is a flat wire spring with the long dimension of the flat wire radial.

17. Oscillatory apparatus comprising an upright support, a body, means carrying the body on the support comprising a spring suspension consisting of an upper coil spring and a coaxial lower coil spring, the upper coil spring being attached at one end to the support and at its other end to the body, the lower spring being also attached at one end to the support and at its other end to the body, points of attachment of said springs to the support being spaced, said springs being vertically aligned and under stress in an equilibrium position of the body, the body being afforded linear oscillation on the spring axis and angular oscillation about the spring axis, said body being displaceable from its equilibrium position either linearly or angularly, and on release being movable through alternating phases of linear oscillation and angular oscillation.

18. Oscillatory apparatus comprising an upright support, a body, means carrying the body on the support comprising a spring suspension consisting of an upper coil spring and a coaxial lower coil spring, the upper coil spring being attached at one end to the support and at its other end to the body, the lower spring being also attached at one end to the support and at its other end to the body, points of attachment of said springs to the support being spaced, said springs being vertically aligned and under stress in an equilibrium position of the body, the body being afforded linear oscillation on the spring axis and angular oscillation about the spring axis, the period of linear oscillation being approximately equal to the period of angular oscillation, said body being displaceable from its equilibrium position either linearly or angularly, and on release being movable through alternating phases of linear oscillation and angular oscillation.

References Cited in the file of this patent

UNITED STATES PATENTS

| | | |
|---|---|---|
| 218,050 | Myers | July 29, 1879 |
| 1,387,384 | Goddard | Aug. 9, 1921 |
| 1,857,750 | Wilbur | May 10, 1932 |
| 2,227,328 | Steiss | Dec. 31, 1940 |

FOREIGN PATENTS

| | | |
|---|---|---|
| 580,255 | Great Britain | Sept. 2, 1946 |